L. C. IRION.
AGRICULTURAL MACHINE.
APPLICATION FILED JAN. 8, 1912.

1,111,465.

Patented Sept. 22, 1914.
2 SHEETS—SHEET 1.

Witnesses:
J. P. Wahler.
Harry M. Test.

Inventor
L. C. Irion.
By Harry Ellis Chandler
Attorney

L. C. IRION.
AGRICULTURAL MACHINE.
APPLICATION FILED JAN. 8, 1912.

1,111,465.

Patented Sept. 22, 1914.
2 SHEETS—SHEET 2.

Witnesses:
J. P. Nahler
Harry M. Fest

Inventor
L. C. Irion.
By Harry Ellis Chandlee
Attorney

UNITED STATES PATENT OFFICE.

LESLIE C. IRION, OF CONGERVILLE, ILLINOIS.

AGRICULTURAL MACHINE.

1,111,465.   Specification of Letters Patent.   Patented Sept. 22, 1914.

Application filed January 8, 1912.   Serial No. 670,031.

*To all whom it may concern:*

Be it known that I, LESLIE C. IRION, a citizen of the United States, residing at Congerville, in the county of Woodford and State of Illinois, have invented certain new and useful Improvements in Agricultural Machines, of which the following is a specification.

This invention relates to improvements in agricultural machines.

One object of the invention is to provide an agricultural machine of such construction that the draft horses may be attached to the side in the ordinary operation of the machine, or to one end to draw the machine to or away from the field.

Another object is to provide a detachable seeding mechanism to operate in conjunction with the operation of harrowing.

Other objects and advantages will be apparent from the following description, and with particular reference to the accompanying drawings.

Figure 1:
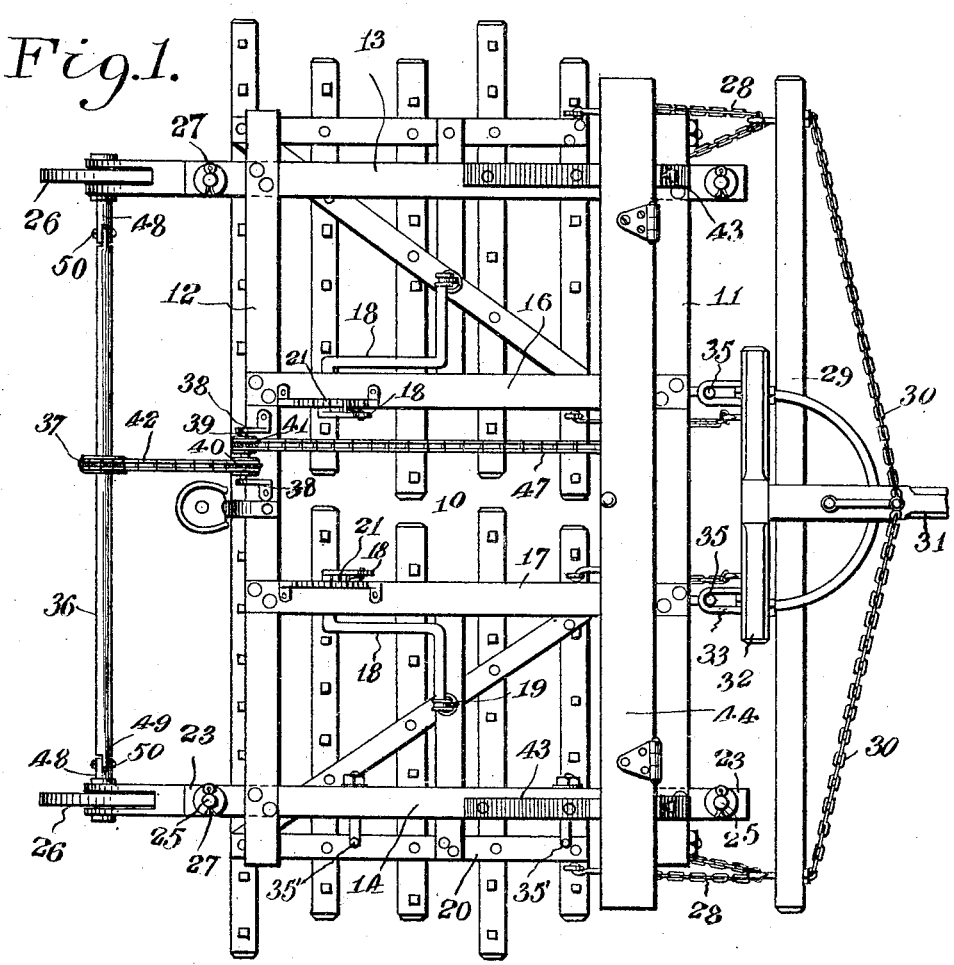
Figure 2:
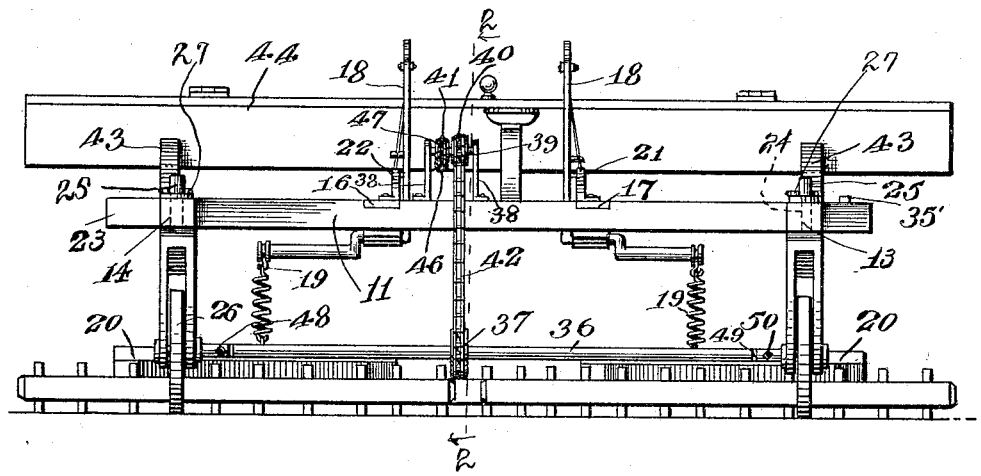
Figure 3:
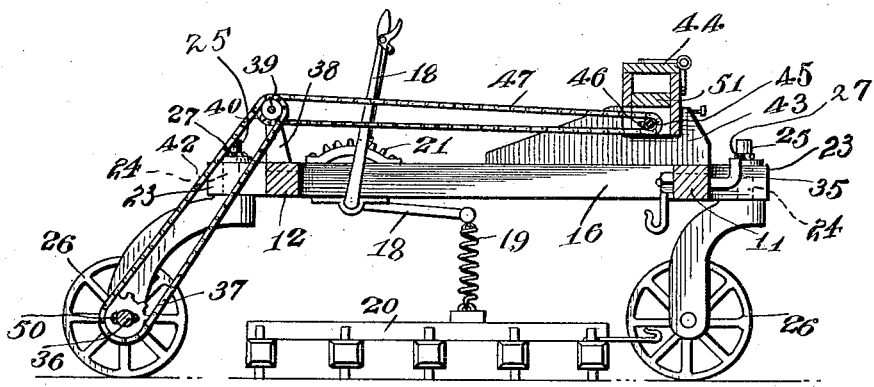

In the drawings: Figure 1 is a top plan view of the machine. Fig. 2 is a rear elevation of the same partly in section. Fig. 3 is a transverse sectional view on the line 2—2 of Fig. 2.

Referring particularly to the drawings, 10 represents the frame which includes the front and rear longer bars 11 and 12, the transverse end bars 13 and 14 and the transverse bars 16 and 17 arranged a suitable distance apart near the middle portions of the bars 11 and 12. Each of the bars 13 and 14 extends a suitable distance beyond both of the bars 11 and 12, and said extensions are formed with vertically arranged openings 24, said extensions being indicated by the reference numeral 23. These openings are adapted to receive the vertical pintles 25, of the caster wheels 26, which wheels support the frame 10 both during the operation of harrowing and moving the machine from one place to another. The upper ends of the pintles 25 are suitably held in place by the fastening devices 27. The hooks 35 secured to the front bar 11 of the frame 10 are adapted to support a draft device. (Not shown). The caster wheels which are mounted in the rear ends of the bars 13 and 14 are mounted on the short sections 48 of a shaft 36 which shaft extends the width of the machine, and has secured thereto centrally of its length the sprocket wheel 37. The shaft 36 is detachably connected to the shorter sections 48 by means of the spliced joints 49 held together by means of the cross pins 50. Mounted on the rear bar 12 of the frame 10 are the brackets 38 in which is journaled the short shaft 39. On this shaft are keyed the sprockets 40 and 41, the former of which receives motion from the sprocket 37 by means of the chain 42. Mounted in brackets 43, on the forward part of the frame is a longitudinally arranged seeding box 44 through which extends the seed delivering shaft 45, carrying centrally thereof a smaller sprocket wheel 46, which receives motion from the sprocket 41 by means of the chain 47. On the end bar 14 are secured the draft hooks 35'.

It will be noted that when the shorter shafts are used, all four of the casters will swing on their pintles, and follow in the direction the machine is being pulled, the hooks 35' then being used for attachment of the draft animals.

It will of course be understood that the shaft section 36 is only used in connection with the seeder box, and when said box is not to be used the shaft section 36 is removed and the caster wheels revolve on the short shafts 48.

What is claimed is:—

1. A seeding machine capable of being drawn sidewise and endwise and including an elongated frame supported by casters, a seeding mechanism, a shaft detachably connected with the shafts of the casters for holding the casters against movement in the frame, driving connections between the detachable shaft and seeding mechanism, and draft attaching means on one side and one end of the frame, whereby upon removal of said shaft the casters will be permitted to swing in the frame so that the machine can be drawn sidewise or endwise.

2. A seeding machine capable of being drawn sidewise and endwise and including an elongated frame supported by casters, a seeding mechanism on the frame, the shafts of the casters having sockets in their inner ends, and a shaft detachably engaged in the said socketed ends of the caster shafts to hold the casters against movement in the frame, whereby upon removal of said shaft the casters will swing on their pintles and permit said machine to be drawn from one side or one end, and driving connections between the detachable shaft and seeding mechanism.

In testimony whereof I affix my signature, in the presence of two witnesses.

LESLIE C. IRION.

Witnesses:
CARL EVELSIZER,
NOAH SCHROCK.

Copies of this patent may be obtained for five cents each, by addressing the "Commissioner of Patents, Washington, D. C."